Dec. 16, 1969  R. WESTERVELT ET AL  3,483,762
MULTIPLE DRIVE CONNECTION
Filed July 3, 1968  2 Sheets-Sheet 1
Fig-1-
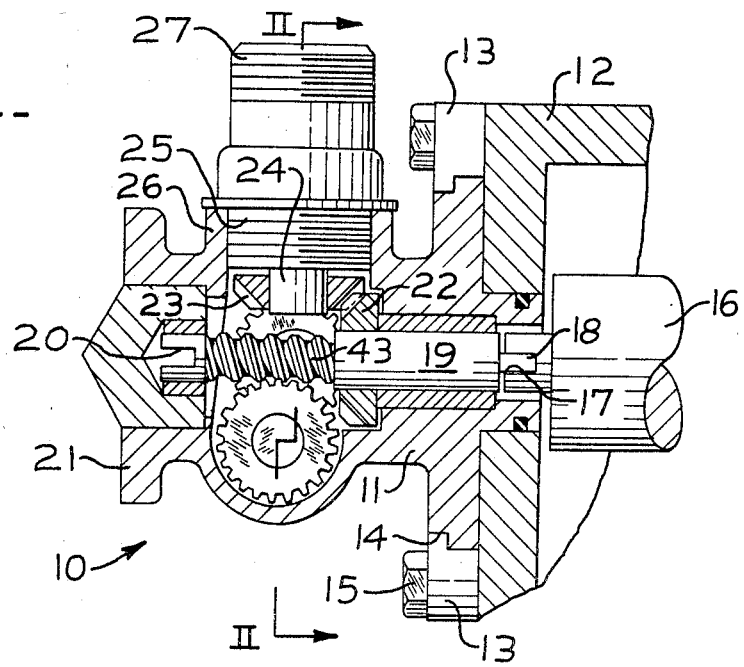
Fig-2-
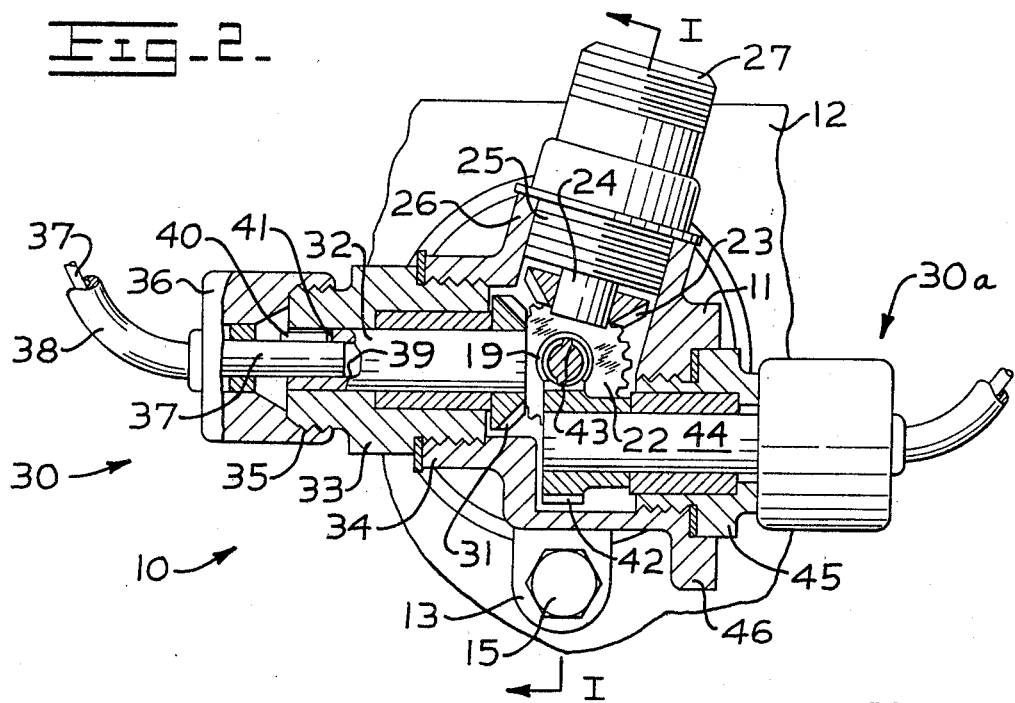
INVENTORS
RALPH WESTERVELT
JOHN R. SUTTLES
BY
Fryer, Tjensvold, Feix, Phillips & Lempio
ATTORNEYS Dec. 16, 1969     R. WESTERVELT ET AL     3,483,762
MULTIPLE DRIVE CONNECTION Filed July 3, 1968     2 Sheets-Sheet 2

INVENTORS
RALPH WESTERVELT
JOHN R. SUTTLES

United States Patent Office 3,483,762
Patented Dec. 16, 1969

3,483,762
MULTIPLE DRIVE CONNECTION
Ralph Westervelt, Pekin, and John R. Suttles, Bellevue, Ill., assignors to Caterpillar Tractor Co., Peoria, Ill., a corporation of California
Filed July 3, 1968, Ser. No. 742,245
Int. Cl. F16h *37/00;* G01p *17/00*
U.S. Cl. 74—15.2                                      12 Claims

ABSTRACT OF THE DISCLOSURE

An engine driven shaft is arranged to drive the power input shaft of a multiple drive connection adapted to have a wide variety of engine accessories connected thereto. The latter shaft is operatively connected to at least two power take-offs for actuating engine accessories, such as a tachometer and a service meter. The multiple drive connection is universally mounted on a vehicle to readily facilitate access to and visual inspection of such accessories.

---

Service meters are employed in conjunction with the operation of internal combustion engines to provide visual means for accurately determining when the engine requires servicing. The service meter comprises a mechanically driven revolution counter which normally registers one unit for a specified number of revolutions of the engine's crankshaft. Registration of a predetermined number of units on the meter indicates the need for engine servicing.

Other engine accessories, such as a tachometer, are oftentimes employed in conjunction with the service meter. In conventional practice the service meter is either removed temporarily and replaced by the tachometer or mounted for operation at a remote location on the vehicle. In addition, such accessories oftentimes require complex and specialized drive connections for use with each engine design employed in a company's product line.

An object of this invention is to overcome the above, briefly described problems by providing a non-complex and compact multiple drive connection having at least two adapting means positioned therearound to operatively connect different types of engine accessories thereto. The power take-offs for such accessories are driven by a single power input shaft adapted to be driven by an engine. One novel aspect of this invention finds at least two adapting means positioned to maintain an output shaft of such power take-off substantially perpendicular with respect to the longitudinal axis of the power input shaft. Another novel aspect comprises means adapted to universally mount the multiple drive connection on a vehicle to permit selective positioning of the accessories for ready access and visibility.

Other objects of this invention will become apparent from the following description and accompanying drawings wherein:

FIG. 1 is a cross-sectional view of a preferred multiple drive connection embodiment of this invention taken on line I—I in FIG. 2;

FIG. 2 is a cross-sectional view taken on line II—II in FIG. 1;

FIG. 3 is a partially sectioned view similar to FIG. 2, but illustrating a service meter connected to a power take-off in lieu of a cable drive; and FIG. 4 is a partially sectioned view similar to FIG. 1, but illustrating the replacement of the FIG. 3 service meter with a cover plate and the attachment of another service meter to another type of power take-off.

Referring to FIGS. 1 and 2, a multiple drive connection 10 comprises a housing 11 mounted on a stationary housing 12 of a vehicle's engine. The mounting means for universally mounting the two housings together preferably comprises clamps 13 arranged to mate with a circular recess 14 formed on the periphery of housing 11. The clamps are releasably secured to housing 12 by bolts 15. Thus it can be seen that release of bolts 15 will permit housing 11 to be rotated to any desired position on housing 12.

An engine driven shaft 16, such as a counter shaft driven at one-half engine speed, has a slot 17 formed therein adapted to mate with a tang 18 to form a detachable coupling. The tang is secured to the righthand end of power input shaft 19 which will thus rotate upon rotation of shaft 16. Shaft 19 provides the drive input to various power take-offs adapted to actuate engine accessories such as a service meter and tachometer.

A first power take-off is effected at a slot 20 formed in the left end of shaft 19. An annular adapting means 21 arranged co-axially with shaft 19 and preferably formed as part of the cast housing may have a removable plug inserted therein when such power take-off is not utilized. A second power take-off comprises a bevel gear 22 splined or otherwise suitably attached to shaft 19 to mesh with a second bevel gear 23. The second bevel gear is suitably splined or otherwise secured to a shaft 24 rotatably mounted in a cylindrical fitting 25 threadably attached to an annular adapting means 26 formed as a part of housing 11.

The second power take-off may further comprise a threaded portion 27 adapted to have an accessory driven by shaft 24 attached thereto. As more clearly illustrated in FIG. 4, a socket 28 and slot 29 may be formed in shaft 24 to receive a mating portion of a cable assembly therein. Such cable assembly may be of the conventional type illustrated at 30 in FIG. 2.

A third power take-off (FIG. 2) may comprise a third bevel gear 31 meshing with gear 22 and suitably splined or otherwise secured to a shaft 32 rotatably mounted in a cylindrical fitting 33. The fitting may be threadably attached to an annular adapting means 34 of housing 11 whereas threaded portion 35 attaches a cap 36 of cable assembly 30 to the fitting. A flexible cable 37 is covered by a sleeve 38 and extends into a bore 39 formed in shaft 32. The cable has a radially projecting lug 40 formed thereon to engage a slot 41 formed in the shaft to thus permit rotation of the cable upon rotation of the shaft.

A fourth power take-off comprises a spur gear 42 meshing with a worm gear 43 preferably formed on or otherwise attached to shaft 19 (FIGS. 1 and 2). The spur gear is splined or otherwise suitably secured to a shaft 44, rotatably mounted in a cap 45 threadably attached to an annular adapting means 46 of housing 11. A cable assembly 30a, identical to cable assembly 30, is detachably connected to shaft 44 to be actuated thereby. Referring to FIG. 3, it can be seen that cable assembly 30a (FIG. 2) may be detached from shaft 44 and replaced by a first type of service meter $S_1$.

In particular, a pinion gear 42a replaces gear 42 and in turn drives a shaft 44a to actuate the counting mechanism of the service meter. A sealed adapter 45a is suitably located in adapting means 46 which previously mounted cap 45 therein. Clamps 13a universally mount the service meter to housing 11 by bolt 15a in a manner substantially similar to that above-described in connection with the description of clamps 13 and bolts 15 of FIG. 1. In particular, this clamping arrangement permits the service meter to be rotated to any desired position to make the counter thereof readily available and visual to the machine's operator or service personnel.

Referring to FIG. 4, a cover plate 47 may be attached to adapting means 46 of housing 11 when neither cable assembly 30a nor service meter $S_1$ is employed at this particlar power take-off. FIG. 4 further illustrates a second type of service meter S₂ having a power input shaft 48 arranged to have a tang 49 thereof engage and be driven by shaft 19 via slot 20. Clamps 13b and bolts 15b function to universally mount service meter S₂ on adapting means 21 of housing 11 after the plug has been removed therefrom. As more clearly illustrated in FIG. 3, extensions 50 (only one illustrated) may be formed on adapting means 21 to have bolts 15b (FIG. 4) threadably secured thereto.

From the above description it can be seen that the non-complex and compact multiple drive connection of this invention facilitates connection of a wide variety of engine accessories thereto. In addition, such accessories may be properly positioned to provide ready access and visibility thereof. Such desiderata is in part provided by the unique construction and arrangement of adapting means 21, 25, 34 and 46.

The latter two adapting means, for example, are positioned on housing 11 to operatively connect and position output shafts 32 and 44, respectively, so that they are substantially perpendicular to the rotational axis of input shaft 19. In addition, mounting means 13, 13a and 13b permit universal attachment of the accessories to housing 11. Thus, a wide variety of accessories may be attached to one or more of the above described adapting means and positioned for ready access and visibility.

What is claimed is:

1. A multiple drive connection comprising a housing, a power input shaft rotatably mounted about a longitudinal axis thereof in said housing, at least two adapting means attached to said housing and positioned therearound to operatively connect the output shafts of at least two power take-offs to said input shaft and mounting means for universally mounting said housing whereby said housing may be rotated about said longitudinal axis to selectively position said adapting means and thus power take-offs attached thereto about said longitudinal axis.

2. The invention of claim 1 wherein said adapting means are positioned on said housing to position the output shafts of at least two power take-offs substantially perpendicular with respect to said longitudinal axis.

3. The invention of claim 1 wherein said housing is attached to a second housing having an engine driven shaft rotatably mounted therein, said power input shaft is operatively connected to said engine driven shaft and said mounting means universally mounts said first mentioned housing on said second housing.

4. The invention of claim 1 further comprising a power take-off means attached to each of said adapting means with each power take-off means having a power output shaft rotatbly mounted about an axis disposed substantially perpendicularly with respect to the longitudinal axis of said power input shaft and means operatively connecting each of said power take-off means to said power input shaft.

5. The invention of claim 1 wherein at least three of said adapting means are attached to said housing.

6. The invention of claim 1 wherein one of said adapting means is positioned on said housing co-axially with respect to the longitudinal axis of said power input shaft.

7. The invention of claim 1 further comprising a worm gear attached to said power input shaft to rotate therewith, said worm gear adapted to be connected to the output shafts of at least two power take-offs.

8. A multiple drive connection comprising a housing, a power input shaft rotatably mounted about a longitudinal axis thereof in said housing and at least two adapting means, each having a power take-off means operatively associated therewith, attached to said housing and positioned therearound to operatively connect and position the output shafts of at least two power take-offs substantially perpendicular with respect to the longitudinal axis of said power input shaft.

9. The invention of claim 8 wherein at least three of said adapting means are attached to said housing and positioned therearound so that an output shaft of a power take-off attached to each adapting means is positioned substantially perpendicular with respect to the longitudinal axis of said power input shaft.

10. The invention of claim 8 comprising another adapting means positioned on said housing in co-axial relationship with respect to the longitudinal axis of said power input shaft.

11. A multiple drive connection comprising a housing, a power input shaft rotatably mounted about a longitudinal axis thereof in said housing and at least three adapting means attached to said housing and positioned therearound so that an output shaft of a power take-off attached to each adapting means is positioned substantially perpendicular with respect to the longitudinal axis of said power input shaft.

12. The invention of claim 11 comprising another adapting means positioned on said housing in co-axial relationship with respect to the longitudinal axis of said power input shaft.

References Cited

UNITED STATES PATENTS

| 1,872,288 | 8/1932 | Helgeby | 74—12 |
| 1,919,512 | 7/1933 | Helgeby et al. | 74—12 |
| 3,126,749 | 3/1964 | Babcock | 74—15.2 |

LEONARD H. GERIN, Primary Examiner

U.S. Cl. X.R.

74—12; 235—95